United States Patent
Hong et al.

(10) Patent No.: US 9,771,488 B2
(45) Date of Patent: Sep. 26, 2017

(54) SELF-CROSSLINKING DISPERSIONS, AND METHODS FOR MAKING AND USING THE SAME

(71) Applicant: Sensient Colors LLC, St. Louis, MO (US)

(72) Inventors: Wenbin Hong, Ballwin, MO (US); Mihaela Madaras, Ballwin, MO (US)

(73) Assignee: Sensient Colors LLC, St. Louis, MO (US)

( * ) Notice: Subject to any disclaimer, the term of this patent is extended or adjusted under 35 U.S.C. 154(b) by 701 days.

(21) Appl. No.: 13/802,560

(22) Filed: Mar. 13, 2013

(65) Prior Publication Data

US 2014/0139595 A1   May 22, 2014

Related U.S. Application Data

(60) Provisional application No. 61/727,840, filed on Nov. 19, 2012.

(51) Int. Cl.
| | | |
|---|---|---|
| *C09D 11/38* | (2014.01) | |
| *C09D 11/322* | (2014.01) | |
| *C09D 11/106* | (2014.01) | |
| *C09D 11/324* | (2014.01) | |

(52) U.S. Cl.
CPC ............ *C09D 11/38* (2013.01); *C09D 11/106* (2013.01); *C09D 11/322* (2013.01); *C09D 11/324* (2013.01)

(58) Field of Classification Search
CPC ....... C09D 11/322; C08F 218/00; C08L 33/08
USPC ..... 524/522, 523, 502, 500, 515; 106/31.13, 106/31.85
See application file for complete search history.

(56) References Cited

U.S. PATENT DOCUMENTS

| | | | | |
|---|---|---|---|---|
| 3,962,167 A | * | 6/1976 | Martorano | B05D 7/16 428/460 |
| 4,190,693 A | * | 2/1980 | Martorano | C09D 133/00 215/DIG. 2 |
| 4,647,598 A | * | 3/1987 | Yada | C08F 2/10 522/14 |
| 5,116,409 A | | 5/1992 | Moffatt | |
| 5,861,447 A | | 1/1999 | Nagasawa et al. | |
| 6,126,731 A | * | 10/2000 | Kemeny | C08F 257/02 106/31.6 |
| 6,849,111 B2 | | 2/2005 | Suzuki et al. | |
| 2002/0193509 A1 | * | 12/2002 | Menovcik | C08G 18/3831 524/801 |
| 2009/0220748 A1 | * | 9/2009 | Kanaya | C09C 3/10 428/195.1 |

FOREIGN PATENT DOCUMENTS

| | | | |
|---|---|---|---|
| JP | 11152424 A | * | 6/1999 |
| JP | 2012224683 | | 11/2012 |
| WO | 2011/063188 | | 5/2011 |
| WO | 2012/009408 | | 1/2012 |
| WO | 2014/078771 | | 5/2014 |

OTHER PUBLICATIONS

JP11152424 English translation retreived Sep. 30, 2015.*
International Search Report and Written Opinion for Application No. PCT/US2013/070521 dated Jan. 24, 2014 (7 pages).

* cited by examiner

*Primary Examiner* — Cachet Sellman
(74) *Attorney, Agent, or Firm* — Michael Best & Friedrich LLP

(57) ABSTRACT

A dispersion comprising a pigment, a polymer comprising a carboxyl group, a crosslinking agent capable of undergoing a crosslinking reaction with the carboxyl group, an inhibition agent comprising a tertiary amine, and a liquid carrier, wherein at least one of the mean particle size and the viscosity of the dispersion increases by less than 20% over about three months in sealed storage at ambient temperature, as determined by accelerated shelf life testing.

24 Claims, No Drawings

SELF-CROSSLINKING DISPERSIONS, AND METHODS FOR MAKING AND USING THE SAME

FIELD OF USE

The present invention relates to self-crosslinking dispersions and methods for making the same. The invention further relates to end use applications for the self-crosslinking dispersions including, but not limited to, coatings on papers, textiles, natural and synthetic fibers, plastics, metal, wood, ceramic, glass, wood laminates and inks. Specific examples of inks include, without limitations, printing ink for paper, textiles, natural and synthetic fibers, plastics, metals, metal deco, wood stains, writing instruments, felt pens, offset and screen printing. Other examples of end uses include, without limitation, inkjet printing applications.

BACKGROUND

Pigments may offer several advantages over water-soluble dyes when it comes to end use applications, including, but not limited to, inks, coatings, paints, papers, toners, textiles, fibers, wood stains, color filters, cosmetics, and plastics. For example, pigments exhibit at least one of greater lightfastness, ozone fastness, waterfastness, optical density and edge acuity compared to water-soluble dyes. However, wet and dry rub durability of coatings made with printing inks still remains a problem even when using pigmented inks.

Crosslinking is a means of increasing the durability of coatings, but crosslinking formulations traditionally have very short shelf-lives due to progress of the crosslinking reaction. Accordingly, a need remains for self-crosslinking dispersions and inks where the crosslinking substantially occurs only after exposure to the atmosphere and optional application of heat. Furthermore, a need remains for self-crosslinking inks where the crosslinking substantially occurs only after printing.

SUMMARY

This disclosure provides dispersions comprising a pigment, a polymer comprising a carboxyl group, a crosslinking agent capable of undergoing a crosslinking reaction with the carboxyl group, an inhibition agent comprising a tertiary amine, and a liquid carrier. At least one of the mean particle size and the viscosity of the dispersion may increase by less than 20% over about three months in sealed storage at ambient temperature, as determined by accelerated shelf life testing. At least one of the mean particle size and the viscosity of the dispersion may increase by less than 20% over about one week in sealed storage at about 60° C. This disclosure also provides inks comprising these dispersions, such as inks that further comprise at least one of a liquid ink diluent, a defoamer, a biocide, and a surfactant. This disclosure provides pre-loaded inkjet cartridges comprising these inks. Finally, this disclosure provides printing methods comprising applying these inks onto a substrate, and drying the ink, whereupon the crosslinking agent and the carboxyl group undergo the crosslinking reaction.

This disclosure also provides methods of preparing a pigment dispersion, comprising: combining a pigment, a polymer comprising a carboxyl group, a crosslinking agent capable of undergoing a crosslinking reaction with the carboxyl group, an inhibition agent comprising a tertiary amine, and a liquid carrier to form a dispersion. At least one of the mean particle size and the viscosity of the dispersion may increase by less than 20% over about three months in sealed storage at ambient temperature, as determined by accelerated shelf life testing. At least one of the mean particle size and the viscosity of the dispersion may increase by less than 20% over about one week in sealed storage at about 60° C.

Other aspects of the invention will become apparent by consideration of the detailed description.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

As used herein, the term "about" is used synonymously with the term "approximately." Illustratively, the use of the term "about" indicates that a recited value may include additional values slightly outside the recited values. This variation may be due to conditions such as experimental error, manufacturing tolerances, variations in equilibrium conditions, and the like. In some embodiments, the term "about" may include the cited value plus or minus 2.5%, 5%, 7.5%, or 10%, among others.

As used herein, the term "dispersion" means a two phase system where one phase consists of finely divided particles (e.g., pigment or dye particles) distributed through a liquid carrier (e.g., a solvent), the particles being the dispersed phase, and the liquid carrier being the continuous phase.

As used herein, the term "stable dispersion" means that the particles are finely divided, uniformly distributed (i.e., substantially homogenous) and resistant to particle growth, flocculation and/or changes in viscosity. For example, stable dispersions disclosed herein may be resistant to changes in the mean particle size and/or the viscosity of the dispersion under certain conditions (e.g., in sealed storage at ambient temperatures) over varying periods of time.

As used herein, the terms "dispersing agent," or "dispersant" mean an agent that is added to a dispersion medium to promote the formation of a stable dispersion.

The term "self-dispersing," as used herein with reference to a particle (e.g., a dye or pigment particle) is a particle that forms a stable dispersion in the absence of any additional dispersing agents.

As used herein, the term "ink" means a dispersion that is capable of being used in a printing process with or without further processing or addition of additives.

As used herein, the term "pigment" means a colored material that is used to impart color to a substrate, such as plain or coated paper, film and other types of receiving media. Colored pigments may be black as well as other colors, and may be present in both dispersions and inks. Pigments that are used to form dispersions and inks, as disclosed herein, generally consist of finely divided pigment particles.

As used herein, the term "accelerated shelf life testing" means a stability test performed at higher temperature (e.g. 60° C.) that would provide the equivalent lifetime at ambient temperature (e.g. 22° C.) based on the Arrhenius equation (1):

$$T_{SL@22} = T_{I@60} * Q_{10}^{(60-22)/10} \quad (1)$$

where $T_{SL@22}$ is the shelf-life at 22° C., $T_{I@60}$ is incubation time at 60° C., $Q_{10}=2$, or rate of destabilization process doubles with every 10° C. increase in temperature.

Based on equation (1), 1 week incubation at 60° C. is equivalent with approximately 3 months at ambient temperature.

As used herein, the term "sealed" storage means that the evaporation of the liquids is prevented during storage by proper capping of the storage container.

As used herein, the term "ambient temperature" means the temperature of the air in a generally temperature controlled space. Ambient temperature refers to a temperature of between about 20° C. and about 25° C.

This disclosure provides dispersions (including inks), inkjet cartridges, and methods of making and using the dispersions, as described in detail below.

I. Dispersions

The dispersions disclosed herein comprise a pigment, a polymer comprising a carboxyl group, a crosslinking agent capable of undergoing a crosslinking reaction with the carboxyl group, an inhibition agent comprising a tertiary amine, a liquid carrier, and one or more optional dispersion additives. The dispersions are generally stable under certain conditions. For example, at least one of the mean particle size and the viscosity of the dispersion may increase by less than 20% over about three months in sealed storage at ambient temperature, as determined by accelerated shelf life testing. Some dispersions may be used as inks, and some may be used to prepare inks, such as by the addition of further components (e.g., liquid ink diluents, defoamers, biocides, and surfactants, among others). Some of the inks disclosed herein may be pre-loaded into inkjet cartridges for use with inkjet printers.

A. Pigments

Suitable pigments that may be used to form the dispersions disclosed herein may include any organic or inorganic pigment known in the art, including, but not limited to, black pigments, yellow pigments, orange pigments, brown pigments, red pigments, violet pigments, blue pigments, green pigments, fluorescent pigments, metal powder pigments, and polymer bond pigments. Pigments also may include, but are not limited to carbon black, azo pigments, phthalocyanine pigments, anthraquinone pigments, perylene and perynone pigments, polycyclic pigments, naphthol pigments, anthrapyrimidone pigment, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, triphenylmethane lake pigments, oxazine lake pigments, metal complex pigments, natural pigments, and inorganic pigments among, others.

Suitable colored pigments may include, for example, yellow pigments such as C.I. Pigment Yellow 1, 2, 3, 4, 5, 6, 10, 12, 13, 14, 16, 17, 24, 55, 61, 65, 73, 74, 81, 83, 93, 94, 95, 97, 99, 100, 108, 109, 110, 117, 120, 123, 124, 128, 129, 133, 138, 139, 147, 150, 151, 153, 154, 155, 156, 167, 168, 172, 173, 174, 175, 176, 177, 179, 180, 181, 182, 183, 184, 185, 187, 188, 190, 191, 192, 193, and 194 among others; red pigments such as, C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48, 49, 50, 51, 52, 53, 55, 60, 64, 68, 81, 83, 87, 88, 89, 90, 95, 112, 114, 119, 122, 123, 136, 144, 146, 147, 148, 149, 150, 151, 163, 164, 166, 168, 169, 170, 161, 172, 175, 176, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264 among others; violet pigments such as C.I. Pigment Violet 1, 2, 3, 5, 13, 19, 23, 25, 27, 29, 31, 32, 37, 39, 42, 44, and 50 among others; blue pigments such as C.I. Pigment Blue 1, 2, 3, 9, 10, 14, 15, 16, 18, 19, 21, 22, 24, 25, 56, 60, 61, 62, 63, 64, 65, and 66, among others; orange pigments such as C.I. Pigment Orange 1, 2, 5, 6, 7, 13, 14, 15, 16, 17, 19, 22, 24, 31, 34, 36, 38, 40, 42, 43, 44, 46, 48, 49, 51, 59, 60, 61, 62, 63, 64, 65, 66, 67, 68, and 69 among others; green pigments such as C.I. Pigment Green 1, 2, 4, 7, 8, 10, 34, 36, 45, and 47, among others; brown pigments such as C.I. Pigment Brown 1, 2, 3, 5, 22, 23, 25, 26, 32, 38, 41, and 42 among others; black pigments such as C.I. Pigment Black 1, 7, 20, 31, and 32 among others, and white pigments such as titanium dioxide. Commercially available colored pigments may include, for example, Pigment Red 122 and Pigment Violet 19 (available from Lansco Colors, Montvale, N.J. or BASF Color, Charlotte, N.C. or Clariant Colors, Charlotte, N.C. or Sun Chemical, Cincinnati, Ohio), Pigment Blue 15:1 (available from Fanwood Chemical, Fanwood, N.J.), Pigment Blue 15:3, Pigment 15:4, Pigment Yellow 74 and Pigment Yellow 97 (available from BASF Color, Charlotte, N.C. or Clariant Colors, Charlotte, N.C. or Sun Chemical, Cincinnati, Ohio), among others. Other suitable pigments may include, but are not limited to Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 146, Solvent Red 160, Solvent Yellow 162, Solvent Violet 10, and Solvent Black 29, among others.

Suitable pigments also may include carbon black, which is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black may be used. This includes channel blacks, gas blacks, lamp blacks, thermal blacks, acetylene blacks and furnace blacks. More particularly, suitable carbon blacks include channel blacks. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R, Cab-O-Jet® 200, Cab-O-Jet® 300, and Cab-O-Jet® 400), Degussa/Orion Carbon (NIPex® 150 IQ, NIPex® 150, Printex® 55, Printex® 80, Printex® 90, Printex® A, Printex® G, Printex® U, Printex® V, Printex® 140U, Printex® 140V, Purex® LS 35, Corax® HP 160, Thermal Black N 990, NIPex® 160 IQ, Nipex® 170IQ, Nipex® 180IQ, NIPex® 90, Special black 4, Special black 4A, Special black 5, Special black 6, Special black 100, Special black 250, Color black FW1, Color black FW2, Color black FW2V, Color black FW18, Color black FW200, Color black 5150, Color black 5160 and Color black S170), Columbian/Birla Carbon (Raven® 780, Raven® 5000 UII, Raven® 1255, Raven® 2500 U, Raven® 3600 U, Raven® 3500, Raven® 5000, Raven® 7000, Raven® 1220 and Raven® 1225), Mitsubishi Kagaku K.K. (MA8, MA11, MA77, MA100, MA220, MA230, MA600, MCF88, #10B, #20B, #30, #33, #40, #44, #45, #45L, #50, #55, #95, #260, #900, #970, #1000, #2200B, #2300, #2350, #2400B, #2650, #2700, #4000B and CF9), Orient Chemical Industries Ltd. (Bonjet Black CW-1, Bonjet Black CW-2, and Bonjet Black CW-3) and Sensient Technologies (Sensijet® Black SDP100, Sensijet® Black SDP1000, and Sensijet® Black SDP2000).

In some embodiments, the pigment may be self-dispersing in a selected continuous phase. The pigment also may not be self-dispersing in a selected continuous phase, and as such, a dispersant may need to be added to a dispersion containing the pigment in order to form a stable dispersion.

In some embodiments, the amount of pigment (by weight) in the dispersion may be at least about 1.0%, at least about 2.0%, at least about 3.0%, at least about 4.0%, at least about 5.0%, at least about 6.0%, at least about 7.0%, at least about 8.0%, at least about 9.0%, at least about 10.0%, at least about 11.0%, at least about 12.0%, at least about 13.0%, at least about 14.0%, at least about 15.0%, at least about 16.0%, at least about 17.0%, at least about 18.0%, at least about 19.0%, at least about 20.0%. Further, the amount of pigment (by weight) in the dispersion may be at most about 40%, such as at most about 30%, and at most about 20%. In some embodiments, the amount of pigment (by weight) in the dispersion may be at most about 40.0%, at most about 35.0%, at most about 30.0%, at most about 25.0%, at most about 20.0%, at most about 15.0%, or at most about 10.0%. This includes embodiments where the amount of pigment (by weight) in the dispersion may be present in an amount ranging from about 10% to about 40%, such as from about 15% to about 30%, and from about 15% to about 20%.

B. Polymers

Polymers may include any carboxyl-group containing polymer that undergoes a crosslinking reaction with a crosslinking agent of this disclosure, and is neutralized by a tertiary amine of this disclosure. Exemplary polymers may include, but are not limited to, a styrene-acrylic copolymer, a styrene-methacrylic acid copolymer, a maleic resin, a maleic anhydride-modified polymer, a carboxylated polyurethane, a carboxylated styrene-butadiene block copolymer, a carboxylated styrene-butadiene-styrene block copolymer, a carboxylated styrene-isoprene-styrene block copolymer, a carboxylated polyolefin, and combinations thereof. Examples of commercially available polymers include, but are not limited to, Joncryl® (available from BASF), ISOBAM® (available from Kuraray Co., Ltd), SUPERCHLON® (available from Nippon Paper Chemicals), Auroren® (available from Nippon Paper Chemicals), Erkamar® (available from Robert Kraemer GmbH & Co. KG), SMA® (available from Cray Valley USA LLC), XIRAN® (available from Polyscope Polymers B.V.), WorleeSin® (available from Worlee-Chemie GmbH), CRAYVALLAC® (available from Cray Valley USA LLC), MICHEM® (available from Michelman), SBLatex® (available from Asahi Kasei Chemicals), HITEX® (available from Hansol Chemical), RL® (available from RLA Polymers PTY LTD), UNIBOND® (available from Unichem, Inc.), Hybridur® (available from Air Products), Alberdingk® (available from Alberdingk Boley), Bayhydrol® (available from Bayer Material Science), NeoCryl® (available from DSM NeoResins), Ecrylic® (available from Ecronova Polymer), Acropol® (available from Kros Link), Jonrez® (available from Meadwestvaco), Liocryl® (available from Synthopol), WorleeCryl® (available from Worlee), Cydrothane® (available from Cytec), Hauthane® (available from Hauthaway), Urotuf® (available from Reichhold), Ruco-coat® (available from Rudolf Group), Picassian® (available from Picassian Polymers), and Incorez® (available from Incorez Ltd). In some embodiments, the polymer may function as a dispersant for the pigment.

In some embodiments, the amount of polymer (by weight) in the dispersion may be at least about 0.1%, such as at least about 0.5%, and at least about 1%. In some embodiments, the amount of polymer (by weight) in the dispersion may be at least about 0.01%, at least about 0.05%, at least about 0.1%, at least about 0.2%, at least about 0.3%, at least about 0.4%, at least about 0.5%, at least about 0.6%, at least about 0.7%, at least about 0.8%, at least about 0.9%, at least about 1.0%, at least about 1.5%, at least about 2.0%, at least about 2.5%, at least about 3.0%, at least about 4.0%, at least about 5.0%, at least about 6.0%, at least about 7.0%, at least about 8.0%, at least about 9.0%, at least about 10.0%, at least about 11.0%, at least about 12.0%, at least about 13.0%, at least about 14.0%, at least about 15.0%, at least about 16.0%, at least about 17.0%, at least about 18.0%, at least about 19.0%, or at least about 20.0%. Furthermore, the amount of polymer (by weight) in the dispersion may be at most about 40%, such as at most about 20%, and at most about 15%. In some embodiments, the amount of polymer (by weight) in the dispersion may be at most about 40.0%, at most about 35.0%, at most about 30.0%, at most about 25.0%, at most about 20.0%, at most about 15.0%, at most about 10.0%, or at most about 5.0%. This includes embodiments where the amount of polymer (by weight) in the dispersion may be present in an amount ranging from about 0.5% to about 20%, such as from about 1% to about 15%, and from about 2% to about 10%.

C. Crosslinking Agents

Suitable crosslinking agents may include any crosslinking agent capable of undergoing a reaction with a carboxyl-group containing polymer of this disclosure in the absence of a tertiary amine of this disclosure but not in the presence of a tertiary amine of this disclosure. Preferably, the crosslinking agent is a carbodiimides reagent, a water-dispersible polymer that contains a carbodiimide group, an oxazoline reagent, a water-dispersible polymer that contains an oxazoline group, a methylated melamine-formaldehyde resin, or a zirconium carbonate salt, such as ammonium zirconium carbonate and potassium zirconium carbonate. Examples of commercially available crosslinking agents include, but are not limited to, Zirmel® (available from MEL Chemicals), Berset® (available from Bercen), Cymel® (available from Cytec), WorleeMin® (available from Worlee), Luwipal® (available from BASF), Zoldine® (available from Dow Chemical), Solucote® (from DSM NeoResins), Carbodilite™ (available from Nisshinbo Chemical Inc.), Resimene® & Maprenal® (available from INEOS), RODA Link® (from TFLUSA), Aerotex® (available from Union Ink), Epocros® (available from Nippon Shokubai Co., Ltd.), and Permutex® (available from Stahl USA Inc.).

In some embodiments, the amount of crosslinking agent (by weight) in the dispersion may be at least about 0.1%, such as at least about 0.5%, and at least about 1%. In some embodiments, the amount of crosslinking agent (by weight) in the dispersion may be at least about 0.01%, at least about 0.05%, at least about 0.1%, at least about 0.2%, at least about 0.3%, at least about 0.4%, at least about 0.5%, at least about 0.6%, at least about 0.7%, at least about 0.8%, at least about 0.9%, at least about 1.0%, at least about 1.5%, at least about 2.0%, at least about 2.5%, at least about 3.0%, at least about 4.0%, at least about 5.0%, at least about 6.0%, at least about 7.0%, at least about 8.0%, at least about 9.0%, at least about 10.0%, at least about 11.0%, at least about 12.0%, at least about 13.0%, at least about 14.0%, at least about 15.0%, at least about 16.0%, at least about 17.0%, at least about 18.0%, at least about 19.0%, at least about 20.0%. Further, the amount of crosslinking agent (by weight) in the dispersion may be at most about 40%, such as than or equal to about 20%, and at most about 10%. In some embodiments, the amount of crosslinking agent (by weight) in the dispersion may be at most about 40.0%, at most about 35.0%, at most about 30.0%, at most about 25.0%, at most about 20.0%, at most about 15.0%, at most about 10.0%, or at most about 5.0%. This includes embodiments where the amount of crosslinking agent (by weight) in the dispersion may be present in an amount ranging from about 1% to about 20%, such as from about 2% to about 10%, and from about 3% to about 5%.

In some embodiments, the crosslinking reaction between a crosslinking agent and a polymer may be facilitated by heat. For example, as discussed in more detail below, some dispersions of this disclosure may be used as inks that are applied to a surface and then dried, whereupon the crosslinking agent and the carboxyl group undergo the crosslinking reaction. The crosslinking reaction may be facilitated by the use of heat after the application or drying process.

D. Inhibition Agents

The dispersions of this disclosure include inhibition agents comprising a tertiary amine to inhibit or prevent the crosslinking reaction from occurring until a desired time. Any suitable tertiary amine, or combination of tertiary amines, may be used, so long as the tertiary amine is easily removable from the dispersion at the time when a user desires the crosslinking reaction to occur. In some embodiments, the inhibition agent is volatile, such that it easily evaporates from the dispersion upon and during exposure to atmospheric conditions, either without or with the application of heat. Suitable tertiary amines include, but are not limited to, triethylamine (TEA), N,N-dimethylaminoethanol (DMEA), triethanolamine (TEA-OH), N,N-diisopropylethanolamine, N,N-diisopropylethylamine, N,N-diethylethanolamine, N-tributylamine, N-butyl-N-ethyl-N-methylamine, N-isopentyldimethylamine, N,N-diethylmethylamine, N-amyldimethylamine, N-methylmorpholine, N,N-dimethylcyclohexylamine, N,N-dimethylisobutylamine, N,N-dimethyl-2-(2-aminoethoxyethanol), N-methyldiethanolamine, N,N-dimethylbenzylamine, tri-n-butylamine, and the like.

The tertiary amine may be selected so as to provide the desired inhibition of the crosslinking reaction (and thus stabilize the dispersion) under selected conditions.

In some embodiments, the amount of inhibition agent (by weight) in the dispersion may be at least about 0.05%, such as at least about 0.25%, and at least about 0.5%. In some embodiments, the amount of inhibition agent (by weight) in the dispersion may be at least about 0.001%, at least about 0.005%, at least about 0.01%, at least about 0.05%, at least about 0.1%, at least about 0.5%, at least about 1.0%, at least about 1.5%, or at least about 2.0%. Further, the amount of inhibition agent (by weight) in the dispersion may be at most about 20%, such as at most about 15%, and at most about 10%. In some embodiments, the amount of inhibition agent (by weight) in the dispersion may be at most about 15.0%, at most about 14.0%, at most about 13.0%, at most about 12.0%, at most about 11.0%, at most about 10.0%, at most about 9.0%, at most about 8.0%, at most about 7.0%, at most about 6.0%, at most about 5.0%, at most about 4.0%, at most about 3.0%, at most about 2.0%, or at most about 1.0%. This includes embodiments where the amount of inhibition agent (by weight) in the dispersion may be present in an amount ranging from about 0.1% to about 15%, such as from about 0.3% to about 10%, and from about 0.5% to about 5%.

In some embodiments, at least one of the mean particle size and the viscosity of the dispersion increases by less than about 1%, less than about 5%, less than about 10%, less than about 15%, less than about 20%, less than about 25%, less than about 30%, less than about 35%, less than about 40%, less than about 45%, less than about 50%, or less than about 100% over a desired time period in sealed storage at ambient temperature, such as over time periods of greater than about a week, greater than about two weeks, greater than about three weeks, greater than about a month, greater than about two months, greater than about three months, greater than about four months, greater than about five months, greater than about six months, greater than about nine months, greater than about a year, or greater than about 1.5 years. For example, at least one of the mean particle size and the viscosity of the dispersion increases by less than 20% over about three months in sealed storage at ambient temperature. In some embodiments, the stability of the dispersion in the presence of the tertiary amine under selected conditions may be assessed and/or determined via accelerated shelf life testing. In some embodiments, at least one of the mean particle size and the viscosity of the dispersion increases by less than about 1%, less than about 5%, less than about 10%, less than about 15%, less than about 20%, less than about 25%, less than about 30%, less than about 35%, less than about 40%, less than about 45%, less than about 50%, or less than about 100% over a desired time period in sealed storage at 60° C., such as over time periods of greater than about 24 hours, greater than about 48 hours, greater than about one week, greater than about two weeks, greater than about three weeks, greater than about four weeks, greater than about five weeks, greater than about six weeks, greater than about seven weeks, greater than about eight weeks, greater than about two months, or greater than about three months. For example, at least one of the mean particle size and the viscosity of the dispersion increases by less than about 20% over a period of 1 week in sealed storage at 60° C.

Surprisingly, it has been found that tertiary amines work substantially better than other amines (e.g., primary and secondary amines, such as diethylamine, among others) as inhibition agents for the dispersions described herein. Primary and secondary amines do not prevent the crosslinking reaction to occur upon mixing of reagents as shown in examples provided.

E. Liquid Carriers

Liquid carriers may comprise any suitable liquid for use as the continuous phase of a liquid dispersion. In particular, the liquid carrier may comprise water, one or more water-soluble organic solvents, or one or more water-miscible organic solvents, either alone or in combination. For example, a particular liquid carrier may include water and one or more organic solvents. Suitable water-soluble and water-miscible organic solvents may include, but are not limited to, alcohols (e.g., methanol, ethanol, propanol, isopropyl alcohol, butanol, polyols, ethylene glycol, glycerine, and PEG, among others), ketones and ketone alcohols (e.g., acetone and diacetone alcohol, among others), ethers (e.g., tetrahydrofuran, dioxane, and alkylethers, among others) ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., pyrrolidone, and N-methyl-2-pyrrolidone, among others), sulfur-containing solvents (e.g., 2,2'-thiodiethanol, dimethylsulfoxide, tetramethylene sulfone, sulfolane among others), sugars and derivatives thereof (e.g., glucose, an oxyethylene adduct of glycerin, and an oxyethylene adduct of diglycerin, among others).

The amount of liquid carrier (by weight) included in the dispersion may be at least about 30%, such as at least about 40%, at least about 50%, at least about 60%, and at least about 70%. Further, the amount of liquid carrier (by weight) in the dispersion may be at most about 95%, particularly at most about 90%, at most about 80%, and at most about 70%. This includes embodiments where the amount of water (by weight) in the ink composition is from about 30% to about 95%, such as from about 40% to about 90%, from about 50% to about 80%, and from about 60 to about 70%, among others. If a mixture of water and organic solvent is used, the amount of organic solvent (by weight) in the dispersion may be at least about 5%, such as at least about 15%, and at least about 25%. Furthermore, the amount of water-soluble organic solvent (by weight) in the dispersion may be at most about 50%, such as at most about 40%, and at most about 30%. This includes embodiments where the amount of organic solvent (by weight) in the dispersion is from about 5% to about 50%, such as from about 15% to about 40%, and from about 25% to about 30%, among others.

It will be appreciated that some dispersions disclosed herein may be used as inks, and some may be used to prepare inks For example, some dispersions may comprise concentrated pigments that are later diluted with a liquid ink diluent to form an ink. Liquid ink diluents generally may comprise water, one or more water-soluble organic solvents, and/or one or more water-miscible organic solvents, either alone or in combination, as described above. The liquid ink diluent may be the same or a different liquid carrier than was used to prepare the concentrated pigment dispersion. Inks are described in more detail below.

F. Additional Dispersion Additives

Various additives optionally may be included in the dispersions of this disclosure to impart any number of desired properties, including, but not limited to, stability, smear resistance, viscosity, surface tension, coating penetration, optical density, color depth, adhesion, highlighter resistance, and crust resistance, among others. The additives may be selected so as to adapt a dispersion to a particular use, such as to make coatings, paints, papers, adhesives, latexes, toners, textiles, fibers, plastics, cosmetics, and inks (e.g., screen printing inks, inkjet printer inks, pen inks, etc.), among other applications. Additional dispersion additives may include, but are not limited to, defoamers, preservatives, surfactants, humectants, penetrants, polymers, buffers and pH modifiers, viscosity modifiers, and any other additives known in the art.

Defoamers may be added to the dispersion to inhibit the formation of foam. Examples of suitable defoamers include, but are not limited to are silicone-based or non-silicone defoamers. Commercially available defoamers include, but are not limited to Dow Corning® 71 and Dow Corning® 74 (from Dow Corning), TegoAirex® 901W, 902W, 904W from Evonik Industries/Tego, Tergitol® L-61, L-62, L-64 and L-101 (from Dow Chemical). The amount of defoamer (by weight) in the dispersion may be at least about 0.1%, such as at least about 0.3%, and at least about 0.5%. In some embodiments, the amount of defoamer (by weight) in the dispersion may be at least 0%, at least about 0.001%, at least about 0.005%, at least about 0.01%, at least about 0.05%, at least about 0.1%, at least about 0.5%, at least about 1.0%, at least about 1.5%, or at least about 2.0%. Further, the amount of defoamer (by weight) in the dispersion may be at most about 3%, such as at most about 2%, and at most about 1%. In some embodiments, the amount of defoamer (by weight) in the dispersion may be at most about 3.0%, at most about 2.9%, at most about 2.8%, at most about 2.7%, at most about 2.6%, at most about 2.5%, at most about 2.4%, at most about 2.3%, at most about 2.2%, at most about 2.1%, at most about 2.0%, at most about 1.9%, at most about 1.8%, at most about 1.7%, at most about 1.6%, at most about 1.5%, at most about 1.4%, at most about 1.3%, at most about 1.2%, at most about 1.1%, at most about 1.0%, at most about 0.9%, at most about 0.8%, at most about 0.7%, at most about 0.6%, at most about 0.5%, at most about 0.4%, at most about 0.3%, at most about 0.2%, or at most about 0.100%. This includes embodiments where the amount of defoamer (by weight) in the dispersion may be present in an amount ranging from about 0.1% to about 3%, such as from about 0.2% to about 1.5%, and from about 0.3% to about 1%.

Preservatives, such as biocides and fungicides, also may be added to dispersions dispersion to inhibit the growth of microorganisms. Examples of suitable preservatives include sodium benzoate, pentachlorophenol sodium, 2-pyridinethiol-1-oxide sodium, sodium sorbate, sodium dehydroacetate, benzisothiazolinone, 1,2-dibenzothiazolin-3-one, 1-(3-chlorallyl)-3,5,7-triaza-1 azoniaadamantane chloride (CTAC), methylisothiazolinone and chloromethylisothiazolinone. Commercially available biocides include UCARCIDE® 250 (available from Union Carbide Company), Proxel® CRL, Proxel® BDN, Proxel® GXL, Proxel® XL-2, Proxel® TN (available from Arch Chemicals, Smyrna, Ga.), Dowicil® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.), and XBINX® (PMC Specialties Group, Inc., Cincinnati, Ohio). The preservatives may be used alone or in combination. The amount of preservatives (by weight) in the dispersion may range from about 0% to about 1.5%, such as from about 0.01% to about 1.0%, and from about 0.1% to about 0.3%. In some embodiments, the amount of preservative (by weight) in the dispersion may be at least 0%, at least about 0.001%, at least about 0.005%, at least about 0.01%, at least about 0.05%, at least about 0.1%, at least about 0.5%, at least about 1.0%, at least about 1.5%, or at least about 2.0%. In some embodiments, the amount of preservative (by weight) in the dispersion may be at most about 1.5%, at most about 1.4%, at most about 1.3%, at most about 1.2%, at most about 1.1%, at most about 1.0%, at most about 0.9%, at most about 0.8%, at most about 0.7%, at most about 0.6%, at most about 0.5%, at most about 0.4%, at most about 0.3%, at most about 0.2%, or at most about 0.100%. For example, the amount of preservative (by weight) in the dispersion may range from about 0.01% to about 0.5%.

Surfactants may be added to the liquid vehicle to reduce the surface tension of the dispersion. The surfactants may be anionic surfactants, non-ionic surfactants and/or cationic surfactants. Suitable surfactants may include, but are not limited to, those listed below and in U.S. Pat. No. 5,116,409 issued May 26, 1992, U.S. Pat. No. 5,861,447 issued Jan. 19, 1999, and U.S. Pat. No. 6,849,111 issued Feb. 1, 2005, each of which is hereby incorporated by reference for all purposes. Exemplary surfactants are commercially available under various well-known trade names, such as the PLURONIC® series (BASF Corporation, Parsippany, N.J.), the TETRONIC® series (BASF Corporation, Parsippany, N.J.), the ARQUAD® series (Akzo Chemical Inc., Chicago, Ill.), the TRITON® series (Union Carbide Corp., Danbury, Conn.), the SURFONIC® series (Texaco Chemical Company, Houston, Tex.), the ETHOQUAD® series (Akzo Chemical Inc., Chicago, Ill.), the ARMEEN® series (Akzo Chemical Inc., Chicago, Ill.), the ICONOL® series (BASF Corporation, Parsippany, N.J.), the SURFYNOL® series (Air Products and Chemicals, Inc. Allentown, Pa.), and the ETHOMEEN® series (Akzo Chemical Inc., Chicago, Ill.), to name a few. The surfactants may be used alone or in combination. The amount of surfactant (by weight) in the dispersion may range from 0% to about 10%, such as from about 0.1% to about 10%, and from about 0.3% to about 5%, among others. In some embodiments, the amount of surfactant (by weight) in the dispersion may be at least 0%, at least about 0.1%, at least about 0.2%, at least about 0.3%, at least about 0.4%, at least about 0.5%, at least about 0.6%, at least about 0.7%, at least about 0.8%, at least about 0.9%, at least about 1.0%, at least about 1.5%, at least about 2.0%, at least about 2.5%, at least about 3.0%, at least about 3.5%, at least about 4.0%, at least about 4.5%, at least about 5.0%, at least about 6.0%, at least about 7.0%, at least about 8.0%, or at least about 9.0%. The amount of surfactant (by weight) in the dispersion may be at most about 10%, at most about 9.5%, at most about 9.0%, at most about 8.5%, at most about 8.0%, at most about 7.5%, at most about 7.0%, at most about 6.5%, at most about 6.0%, at most about 5.5%, at most about 5.0%, at most about 4.5%, at most about 4.0%, at most about 3.5%, at most about 3.0%, at most about 2.5%, at most about 2.0%, at most about 1.5%, or at most about 1.0%. For example, the amount of surfactant (by weight) in the dispersion may range from about 0.1% to about 8%.

One or more humectants may be added to the dispersion, such as to form a dispersion that is less likely to clog an inkjet nozzle despite drying that occurs during periods of latency. Humectants may be selected from materials having high hygroscopicity and water-solubility. Examples of humectants include, but are not limited to, polyols such as glycerol and ethylene glycol, alcohol ethers such as diethylene glycol and triethylene glycol, lactams such as 2-pyrrolidone, urea compounds such as urea, 1,3-dimethylimidazolidinone, saccharides such as sorbitol, 1,4-cyclohexanedimethanol, 1-methyl-2-piperidone, N-ethylacetamide, 3-amino-1,2-propanediol, ethylene carbonate; butyrolacetone and Liponic EG-1. There are no particular limitations on the amount used of the humectant, but in general the amount of humectant (by weight) in the ink composition may range from about 0% to about 30%, particularly from about 1% to about 15%, and more particularly from about 5% to about 10%. In some embodiments, the amount of humectant (by weight) in the ink composition may be at least 0%, at least about 1.0%, at least about 2.0%, at least about 3.0%, at least about 4.0%, at least about 5.0%, at least about 6.0%, at least about 7.0%, at least about 8.0%, at least about 9.0%, at least about 10.0%, at least about 11.0%, at least about 12.0%, at least about 13.0%, at least about 14.0%, at least about 15.0%, at least about 16.0%, at least about 17.0%, at least about 18.0%, at least about 19.0%, at least about 20.0%. In some embodiments, the amount of humectant (by weight) in the ink composition may be at most about 30%, at most about 25%, at most about 20%, at most about 15%, at most about 14%, at most about 13%, at most about 12%, at most about 11%, at most about 10%, at most about 9.5%, at most about 9.0%, at most about 8.5%, at most about 8.0%, at most about 7.5%, at most about 7.0%, at most about 6.5%, at most about 6.0%, at most about 5.5%, or at most about 5.0%.

Penetrants may be added to dispersions so as to make them less likely to bleed when applied to a media (e.g., a print media, such as paper). Examples of penetrants may include, but are not limited to, alkyl alcohols having 1 to 4 carbon atoms, such as ethanol, glycol ethers, such as ethylene glycol monomethyl ether, diols such as 1,2-alkyl diols, formamide, acetamide, dimethylsulfoxide, sorbitol and sulfolane. The penetrants may be used alone or in combination. The amount of penetrant (by weight) in the dispersion ranges from about 0% to about 20%, particularly from about 1% to about 15%, and more particularly from about 2% to about 10%. In some embodiments, the amount of penetrant (by weight) in the dispersion may be at least 0%, at least about 1.0%, at least about 2.0%, at least about 3.0%, at least about 4.0%, at least about 5.0%, at least about 6.0%, at least about 7.0%, at least about 8.0%, at least about 9.0%, at least about 10.0%, at least about 11.0%, at least about 12.0%, at least about 13.0%, at least about 14.0%, or at least about 15.0%. In some embodiments, the amount of penetrant (by weight) in the dispersion may be at most about 20%, at most about 15%, at most about 14%, at most about 13%, at most about 12%, at most about 11%, at most about 10%, at most about 9.5%, at most about 9.0%, at most about 8.5%, at most about 8.0%, at most about 7.5%, at most about 7.0%, at most about 6.5%, at most about 6.0%, at most about 5.5%, or at most about 5.0%, at most about 4.5%, at most about 4.0%, at most about 3.5%, at most about 3.0%, or at most about 2.5% For example, the amount of penetrant (by weight) in the dispersion may range from about 2% to about 5%.

Additional polymers may be added to dispersions to improve the water-fastness, rub and lightfastness of images left behind on media (e.g., print media) after the dispersion has been applied to the media and dried. Suitable additional polymers may include, but are not limited to, polyvinyl alcohol, polyester, polyestermelamine, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl-naphthalene-acrylic acid copolymers, vinyl naphthalene-maleic acid copolymers and salts thereof. The amount of additional polymer (by weight) in the dispersion may range from about 0% to about 20%, such as from about 0.1% to about 10%, and from about 0.2% to about 7%, among others. In some embodiments, the amount of additional polymer (by weight) in the dispersion may be at least 0%, at least about 0.001%, at least about 0.005%, at least about 0.01%, at least about 0.05%, at least about 0.1%, at least about 0.5%, at least about 1.0%, at least about 2.0%, at least about 3.0%, at least about 4.0%, at least about 5.0%, or at least about 10.0%. In some embodiments, the amount of additional polymer (by weight) in the dispersion may be at most about 20.0%, at most about 19.0%, at most about 18.0%, at most about 17.0%, at most about 16.0%, at most about 15.0%, at most about 14.0%, at most about 13.0%, at most about 12.0%, at most about 11.0%, at most about 10.0%, at most about 9.0%, at most about 8.0%, at most about 7.0%, at most about 6.0%, at most about 5.0%, at most about 4.0%, at most about 3.0%, at most about 2.0%, at most about 1.0%, or at most about 0.500%. For example, the amount of additional polymer (by weight) in the dispersion may range from about 0.1% to about 5.0%.

Additional polymers may include other self-crosslinking polymers to improve the durability of images after the dispersion has been applied to the media and dried. Suitable additional self-crosslinking polymers may include, but are not limited to, self-crosslinking polyurethane dispersions, self-crosslinking acrylic polymers, self-crosslinking styrene-acrylic copolymers, self-crosslinking styrene-butadiene latexes, self-crosslinking styrene-isoprene latexes, self-crosslinking acrylonitrile-butadiene latexes, self-crosslinking alkyd dispersions, self-crosslinking vinyl polymers, self-crosslinking silicone dispersions, self-crosslinking polyamide dispersions, self-crosslinking chlorinated olefin dispersions, self-crosslinking polyester dispersions, and the like. The amount of additional self-crosslinking polymer (by weight) in the dispersion may range from 0% to about 20%, such as from 0.1% to about 15%, and from about 0.2% to about 10%, among others. In some embodiments, the amount of additional self-crosslinking polymer (by weight) in the dispersion may be at least 0%, at least about 0.001%, at least about 0.005%, at least about 0.01%, at least about 0.05%, at least about 0.1%, at least about 0.5%, at least about 1.0%, at least about 2.0%, at least about 3.0%, at least about 4.0%, at least about 5.0%, or at least about 10.0%. In some embodiments, the amount of additional self-crosslinking polymer (by weight) in the dispersion may be at most about 20.0%, at most about 19.0%, at most about 18.0%, at most about 17.0%, at most about 16.0%, at most about 15.0%, at most about 14.0%, at most about 13.0%, at most about 12.0%, at most about 11.0%, at most about 10.0%, at most about 9.0%, at most about 8.0%, at most about 7.0%, at most about 6.0%, at most about 5.0%, at most about 4.0%, at most about 3.0%, at most about 2.0%, at most about 1.0%, or at most about 0.500%. For example, the amount of additional self-crosslinking polymer (by weight) in the dispersion may range from about 0.1% to about 5.0%.

Buffers and pH modifiers may be added to dispersions to adjust and/or buffer them to any desired pH. Suitable pH modifiers may include, but are not limited to, alkali hydroxides, alkali carbonates and bicarbonates, triethylamine, dimethylethanolamine, triethanolamine, mineral acids, hydrochloric acid, and sulfuric acid, among others. The pH modifiers may be used alone or in combination. The amount of pH modifier (by weight) in the ink composition may range from 0% to about 3.0%, such as from about 0.1% to about 2.0%, and from about 0.5% to about 1.5%, among others. In some embodiments, the amount of pH modifier (by weight) in the ink composition may be at least 0%, at least about 0.001%, at least about 0.005%, at least about 0.01%, at least about 0.05%, at least about 0.1%, at least about 0.5%, at least about 1.0%, at least about 1.5%, or at least about 2.0%. In some embodiments, the amount of pH modifier (by weight) in the ink composition may be at most about 3.0%, at most about 2.9%, at most about 2.8%, at most about 2.7%, at most about 2.6%, at most about 2.5%, at most about 2.4%, at most about 2.3%, at most about 2.2%, at most about 2.1%, at most about 2.0%, at most about 1.9%, at most about 1.8%, at most about 1.7%, at most about 1.6%, at most about 1.5%, at most about 1.4%, at most about 1.3%, at most about 1.2%, at most about 1.1%, at most about 1.0%, at most about 0.9%, at most about 0.8%, at most about 0.7%, at most about 0.6%, at most about 0.5%, at most about 0.4%, at most about 0.3%, at most about 0.2%, or at most about 0.100%. For example, the amount of pH modifier (by weight) in the dispersion may range from about 0.2% to about 2.5%.

The dispersions of this disclosure may contain one or more viscosity modifiers. Viscosity modifiers may include resin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, HEUR (hydrophobic ethoxylated urethanes), HASE (hydrophobically modified alkali swellable emulsions), ASE (alkali swellable emulsions), and combinations thereof. The amount of viscosity modifier (by weight) in the dispersion may range from 0% to about 10%, such as from about 0.5% to about 8%, and from about 1% to about 5%. In some embodiment, the amount of viscosity modifier (by weight) in the dispersion may be at least 0%, at least about 0.001%, at least about 0.005%, at least about 0.01%, at least about 0.05%, at least about 0.1%, at least about 0.5%, at least about 1.0%, at least about 1.5%, or at least about 2.0%, at least about 2.5%, or at least about 5.0%. In some embodiments, the amount of viscosity modifier (by weight) in the dispersion may be at most about 10.0%, at most about 9.0%, at most about 8.0%, at most about 7.0%, at most about 6.0%, at most about 5.0%, at most about 4.0%, at most about 3.0%, at most about 2.0%, at most about 1.0%, or at most about 0.500%. For example, the amount of viscosity modifier (by weight) in the dispersion may range from about 1% to about 7%.

Other components which may be added to the dispersions of this disclosure may include antioxidants, ultraviolet absorbers, chelating agents, electric conductivity adjusters, oxygen absorbers, anti-kogation agents, anti-curling agents, colorants, and fragrances, among others.

G. Inks

As discussed above, some of the dispersions disclosed herein may be used as inks, and some may be used to prepare inks, such as inks used for writing utensils, screen printing, inkjet printing, stamp applications, and the like. Specifically, some dispersions may be capable of being used in a printing process without further processing or addition of additives, whereas others may require the addition of liquid ink diluents and/or one or more other additives in order to prepare dispersions that are capable of being used in a printing process. Any of the liquid carriers or other additives described above may be added to form a dispersion that may be used as an ink.

For example, some inks may be formed from a concentrated pigment dispersion by adding one or more of a liquid ink diluent, a defoamer, a preservative (e.g., a biocide), a surfactant, a humectant, a penetrant, a polymer, a buffer, a viscosity modifier, and any other desired additive described herein, among others. The amount of concentrated pigment dispersion used to form the ink depends on the formulation of the concentrated pigment dispersion, such as the total amount of pigment and other components in the dispersion. In some embodiments, the amount of concentrated pigment dispersion (by weight) in the ink composition may be at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, at least about 30%, at least about 31%, at least about 32%, at least about 33%, at least about 34%, at least about 35%, at least about 40%, at least about 45%, at least about 50%, at least about 55%, at least about 60%, or at least about 65%. In some embodiments, the amount of concentrated pigment dispersion (by weight) in the ink composition may be at most about 70%, at most about 65%, at most about 60%, at most about 55%, at most about 50%, at most about 45%, at most about 40%, at most about 35%, at most about 30%, at most about 25%, at most about 20%, at most about 15%, or at most about 10%. This includes embodiments where the amount of concentrated pigment dispersion (by weight) in the ink composition may be present in an amount ranging from about 1% to about 70%.

Some of the inks disclosed herein may be adapted specifically for use in textile printing processes. Textile printing inks may be formulated to have at least one of the following properties: 1) accepted fastnesses to textile fabrics such as cotton, silk, wool, nylon, polyester, polyamide, polyacrylonitrile, polyacrylic or blends of the same; and 2) ease of application and fixation.

Some of the inks disclosed herein may be adapted specifically for use as inkjet printer inks, where droplets of the ink are ejected from a printing apparatus and are deposited onto a substrate to generate an image. Suitable printing apparatus may include, but are not limited to, Continuous Inkjet (CIJ), Drop-on-Demand Valve (DoD Valve), and Drop-on-Demand Piezo-Electric (DoD Piezo). Suitable substrates may include, but are not limited to, plain papers, bonded papers, coated papers, transparency materials, textile materials, metals, ceramics, glass, plastics, polymeric films and inorganic substrates, and woods, among others. Inkjet inks may be formulated to have the correct properties to allow for at least one of the following: 1) provide uniform, bleed-free images with high resolution and high density on print media; 2) not cause nozzle clogging which typically occurs due to drying of the ink at a distal end of a nozzle; 3) rapidly dry on substrate (paper, fabric, film, etc.); 4) demonstrate good long-term storage stability; and 5) demonstrate print characteristics which are independent of the substrate quality. Inkjet inks also may provide better ink stability and robustness against fluctuating temperature conditions during transport and storage, which may cause nozzle clogging, banding, and poor print quality.

Because some inks are stored under specific conditions for extended periods of time after they have been made, they must be formulated to be substantially stable dispersions under those conditions, so that the properties of the ink do not change over the extended time period. For example, inkjet inks generally are stored in inkjet printer cartridges for extended periods, where the ambient atmosphere is substantially inhibited or prevented from coming into contact with the ink until it is ejected from the cartridge. Some inks of this disclosure, including but not limited to inkjet inks, may be formulated so that, when stored in sealed storage, they are substantially stable dispersions over an extended time period. For example, some inks may be formulated so that they include volatile tertiary amines that do not evaporate when under sealed storage (thereby inhibiting the crosslinking reaction between the carboxyl group-containing polymer and the crosslinking agent), but do evaporate when the ink comes into contact with the ambient atmosphere, whereupon the crosslinking agent and the carboxyl group undergo the crosslinking reaction.

In some embodiments, at least one of the mean particle size and the viscosity of the ink increases by less than about 1%, less than about 5%, less than about 10%, less than about 15%, less than about 20%, less than about 25%, less than about 30%, less than about 35%, less than about 40%, less than about 45%, less than about 50%, or less than about 100% over a desired time period in sealed storage at ambient temperature, such as over time periods of greater than about a week, greater than about two weeks, greater than about three weeks, greater than about a month, greater than about two months, greater than about three months, greater than about four months, greater than about five months, greater than about six months, greater than about nine months, greater than about a year, or greater than about 1.5 years. For example, at least one of the mean particle size and the viscosity of the ink increases by less than 20% over about three months in sealed storage at ambient temperature. In some embodiments, the stability of the ink under selected conditions may be assessed and/or determined via accelerated shelf life testing. In some embodiments, at least one of the mean particle size and the viscosity of the ink increases by less than about 1%, less than about 5%, less than about 10%, less than about 15%, less than about 20%, less than about 25%, less than about 30%, less than about 35%, less than about 40%, less than about 45%, less than about 50%, or less than about 100% over a desired time period in sealed storage at 60° C., such as over time periods of greater than about 24 hours, greater than about 48 hours, greater than about one week, greater than about two weeks, greater than about three weeks, greater than about four weeks, greater than about five weeks, greater than about six weeks, greater than about seven weeks, greater than about eight weeks, greater than about two months, or greater than about three months. For example, at least one of the mean particle size and the viscosity of the ink increases by less than about 20% over a period of 1 week in sealed storage at 60° C.

In some embodiments, at least one of the mean particle size and the viscosity of the inkjet ink increases by less than about 1%, less than about 5%, less than about 10%, less than about 15%, less than about 20%, less than about 25%, less than about 30%, less than about 35%, less than about 40%, less than about 45%, less than about 50%, or less than about 100% over a desired time period in sealed storage at ambient temperature, such as over time periods of greater than about a week, greater than about two weeks, greater than about three weeks, greater than about a month, greater than about two months, greater than about three months, greater than about four months, greater than about five months, greater than about six months, greater than about nine months, greater than about a year, or greater than about 1.5 years. For example, at least one of the mean particle size and the viscosity of the inkjet ink increases by less than 20% over about three months in sealed storage at ambient temperature. In some embodiments, the stability of the inkjet ink under selected conditions may be assessed and/or determined via accelerated shelf life testing. In some embodiments, at least one of the mean particle size and the viscosity of the inkjet ink increases by less than about 1%, less than about 5%, less than about 10%, less than about 15%, less than about 20%, less than about 25%, less than about 30%, less than about 35%, less than about 40%, less than about 45%, less than about 50%, or less than about 100% over a desired time period in sealed storage at 60° C., such as over time periods of greater than about 24 hours, greater than about 48 hours, greater than about one week, greater than about two weeks, greater than about three weeks, greater than about four weeks, greater than about five weeks, greater than about six weeks, greater than about seven weeks, greater than about eight weeks, greater than about two months, or greater than about three months. For example, at least one of the mean particle size and the viscosity of the inkjet ink increases by less than about 20% over a period of 1 week in sealed storage at 60° C.

It should be appreciated that the present disclosure also provides for pre-loaded inkjet cartridges comprising an ink that is stable for extended time periods in sealed storage under ambient temperatures.

II. Methods of Using Dispersions

In addition to the dispersions described above, this disclosure provides methods of using the dispersions. Dispersions disclosed herein may be used as or in coatings, paints, papers, adhesives, latexes, toners, textiles, fibers, plastics, and cosmetics. The dispersions also may be used as inks in printing methods such as sublimation printing, transfer printing, direct printing, stamp printing and inkjet printing, among others. Printing methods of this disclosure comprise applying an ink of this disclosure onto a substrate (e.g., paper, transparency materials, textiles, metals, ceramics, glass, plastics, polymeric films inorganic substrates, and woods, among others), and drying the ink, whereupon the crosslinking agent and the carboxyl group undergo the crosslinking reaction.

Some printing methods may include using a printer, including, but not limited to, CIJ, DoD Valve, and DoD Piezo printers. For example, as described above, some inks may be pre-loaded into an inkjet print cartridge that substantially inhibits or prevents the ambient atmosphere from coming into contact with the ink until the ink is dispensed from the cartridge. The print cartridge thus also may inhibit or prevent any volatile tertiary amine in the ink from evaporating until the ink is dispensed from the ink cartridge, whereupon the tertiary amine evaporates, and the crosslinking agent and carboxyl group-containing polymer undergo the crosslinking reaction. As such, the crosslinking reaction substantially may occur during the drying step, after the drying step, or both.

In some embodiments, the drying step may include heating the ink. For example, a heat source (e.g., a heat press) or heated air blown from a heat source (e.g., IR heater, a hair dryer, oven, etc.) may be used to heat the ink after application to a substrate. For inkjet printers, the printer may be adapted to heat the ink during or after dispensation from a print cartridge. Heating the printed ink may facilitate the crosslinking reaction, either by increasing the rate of reaction between the carboxyl group-containing polymer and the crosslinking agent, or by speeding up removal of the tertiary amine.

III. Methods of Making Dispersions

This disclosure also provides methods of making the dispersions disclosed herein, comprising: combining a pigment, a polymer comprising a carboxyl group, a crosslinking agent capable of undergoing a crosslinking reaction with the carboxyl group, an inhibition agent comprising a tertiary amine, and a liquid carrier to form a dispersion, where at least one of the mean particle size and the viscosity of the dispersion may increase by less than 20% over about three months in sealed storage at ambient temperature, as determined by accelerated shelf life testing. In some embodiments, the method further comprises milling the pigment. This milling step may occur either during or after the combining step. Moreover, the crosslinking agent may be combined with the other components of the dispersion either before or after the milling step.

EXAMPLES

Exemplary embodiments of the present invention are provided in the following examples. The following examples are presented to illustrate the present invention and to assist one of ordinary skill in making and using the same. The examples are not intended in any way to otherwise limit the scope of the invention.

As used herein, the following terms have the corresponding meanings.

"Joncryl HPD 296"=Joncryl® HPD 296, a 35.5% solids solution of a high molecular weight acrylic resin. Available commercially from BASF.

"Joncryl 67"=Joncryl® 67, a high molecular weight, acrylic resin. Available commercially from BASF.

"TEA-OH"=Triethanolamine. Available commercially from Sigma-Aldrich Co.

"DMEA"=2-Dimethylaminoethanol. Available commercially from Sigma-Aldrich Co.

"Joncryl HPD 96"=Joncryl® HPD 96, an acrylic resin. Available commercially from BASF.

"Joncryl 683"=Joncryl® 683, a low acid-value acrylic resin. Available commercially from BASF.

"Tego 901W"=TEGO® Airex 901 W, a defoamer containing a polyether siloxane copolymer and fumed silica. Available commercially from Evonik Industries, Essen, Germany.

"BYK-024"=BYK®-024, a defoamer containing foam-destroying polysiloxanes and hydrophobic solids in polyglycol. Available commercially from BYK Additives & Instruments, Wallingford, Conn.

"Raven 2500"=Raven® 2500, a carbon black pigment. Available commercially from Columbian Chemicals Company/Birla Carbon, Marietta, Ga.

"Proxel GXL"=Proxel™ GXL, an antimicrobial preservative. Available commercially from Arch Chemicals Inc., Smyma, Ga.

"BG10"=Clariant® Inkjet Cyan BG10 pigment. Available commercially from Clariant Corporation, Charlotte, N.C.

"SDP 100"=Sensijet® Black SDP 100, a carbon black pigment. Available commercially from Sensient Technologies, St Louis, Mo.

"Aerosol GPC"=Aerosol® GPG, an anionic surfactant. Available commercially from Cytec Industries, Inc., West Paterson, N.J.

"CoatOSil 1220"=CoatOSil* 1220, an organomodified siloxane surfactant. Available commercially from Momentive Performance Materials Holdings Inc.

"Zirmel 1000"=Zirmel® 1000, a potassium zirconium carbonate crosslinker. Available commercially from MeI Chemicals, Inc., Flemington, N.J.

"Berset 2720"=Berset® 2720, an ammonium zirconium carbonate insolubilizer. Available commercially from Bercen, Inc., Denham Springs, La.

"Carbodilite SV-02"=Carbodilite™ SV-02, a polycarbodiimide available commercially from Nisshinbo Chemical Inc., Chiba, Japan.

"Carbodilite V-02-L2"=Carbodilite™ V-02-L2, a polycarbodiimide available commercially from Nisshinbo Chemical Inc., Chiba, Japan.

"Cymel 385"=Cymel® 385, a methylated melamine resin. Available commercially from Cytec Industries Inc.

"Epocros WS-700"=Epocros® WS-700, an oxazoline-functional polymer. Available commercially from Nippon Shokubai Co., Ltd., Osaka, Japan.

The crosslinkers used in this disclosure are listed in Table I. The term "PZC" means a water solution containing 20% by weight solid content of potassium zirconium carbonate. The other terms have meanings consistent with their respective values shown in Table I.

TABLE I

| Term | Type | Crosslinker | Solvent | Solid % |
|---|---|---|---|---|
| PZC | Potassium zirconium carbonate | Zirmel 1000 | Water | 20% |
| AZC | Ammonium zirconium carbonate | Berset 2720 | Water | 32% |
| CDI-SV02 | Polycarbodiimide | Carbodilite SV-02 | Water | 40% |
| CDI-V02L2 | Polycarbodiimide | Carbodilite V-02-L2 | Water | 40% |
| MMM | Methylated melamine resin | Cymel 385 | Water | 78% |
| OXA | Oxazoline-functional polymer | Epocros WS-700 | Water | 25% |

Example 1

Inhibition Effect of Tertiary Amines

The formulations of Table II were prepared by mixing specified amount of Joncryl® polymers, crosslinkers and deionized water under agitation. A clear solution was obtained for all mixtures. The formulations were then allowed to sit at 60° C. for select periods of time in sealed storage containers. After time, the visible appearance of the formulations was recorded. A clear appearance means no reaction has occurred, gelling or visible aggregation of particles means a reaction between mixed components has occurred and the mixture is not stable. As can be seen in Table II, formulations comprising mixtures of Joncryl HPD 96 and Joncryl HPD 296, which are ammonia salts, are unstable. On the contrary, formulations comprising Joncryl 67 tertiary amine salts are stable.

2.1 Self-crosslinking carbon black dispersions using a milling process (examples d2-A to d2-D): In a tall 1 beaker, 86.40 g of Joncryl 683 (25% TEA-OH salt solution), 43.20 g of Joncryl 67 (25% TEA-OH salt solution), 0.90 g of BYK-024, 2.25 g of Tego 901W, and 207.90 g of deionized water were mixed together. While stirring the contents of the beaker with a Teflon® blade at 500 rpm, 108 g of Raven 2500 was added to the mixture. The resulting mixture was milled in a Hockmeyer basket mill at 2500 rpm for 13 hours, resulting in an average particle size of 121.9 nm (Z-average). The resulting mixture was let down to 20.47% solid content by adding water, and 0.3% total weight of Proxel GXL was added, giving a dispersion with 15.746% solids content of carbon black and 4.724% solids content of Joncryl® polymers.

To prepare formulation d2-A, 100 g of the resulting dispersion and 7.584 g of CDI-VO2L2 crosslinker solution (40%) were mixed under agitation until a homogeneous mixture was obtained. Formulations d2-B to d2-D were prepared according to the same procedure. The amount of crosslinkers added was 11.036 g, 3.460 g and 1.008 g, respectively, for the PZC, AZC and MMM solutions.

The self-crosslinking dispersions were allowed to incubate at 60° C. for select periods of time in sealed storage containers. After time, the particle size (Z-average) and viscosity were measured to monitor their stability as a measure of dispersion stability. As can be seen in Table III, the dispersions are stable.

TABLE II

| ID | Formulation | Counter ion | Crosslinker | Starting | 2 weeks of incubation | 4 weeks of incubation |
|---|---|---|---|---|---|---|
| 1-A | Joncryl HPD 296 (10 g)/water (8.75 g) | ammonia | PZC (1.25 g) | Clear solution | Gelled | N/A |
| 1-B | Joncryl 67 TEA-OH salt 25% solution (10 g)/water (8.75 g) | TEA-OH | PZC (1.25 g) | Clear solution | Clear | Clear |
| 1-C | Joncryl HPD 296 (10 g)/water (8.75 g) | ammonia | AZC (1.25 g) | Clear solution | Gelled | N/A |
| 1-D | Joncryl 67 TEA-OH salt 25% solution (10 g)/water (8.75 g) | TEA-OH | AZC (1.25 g) | Clear solution | Clear | Clear |
| 1-E | Joncryl HPD 96 (30 g)/water (15 g) | ammonia | CDI-SV02 (1.275 g) | Clear solution | Particle aggregated | Large chunks |
| 1-F | Joncryl 67 (1 g)/DMEA (0.367 g)/water (20 g) | DMEA | CDI-SV02 (2.213 g) | Clear solution | Clear | Clear |
| 1-G | Joncryl HPD 296 (5.634 g)/water (9.899 g) | ammonia | OXA (4.467 g) | Clear solution | Particle aggregated | Particle aggregated |
| 1-H | Joncryl 67 DMEA salt 25% solution (8.000 g)/water (5.251 g) | DMEA | OXA (6.749 g) | Clear solution | Clear | Clear |

Example 2

Self-crosslinking Dispersions containing Styrene Acrylic Copolymer Tertiary Amine Salts Self-crosslinking dispersions of Table III were prepared using a milling or blending process, depending on the nature of the pigments.

TABLE III

| Dispersion Label | Pigment/Dispersant | Crosslinker | Starting | 2 weeks of incubation | 4 weeks of incubation |
|---|---|---|---|---|---|
| d2-A | Raven 2500 Carbon/Joncryl 67 TEA-OH salt/Joncryl 683 TEA-OH salt | CDI-V02L2 | 112.4 nm/3.26 cps | 133.3 nm/3.43 cps | 115.7 nm/3.39 cps |

TABLE III-continued

| Dispersion Label | Pigment/Dispersant | Crosslinker | Starting | 2 weeks of incubation | 4 weeks of incubation |
|---|---|---|---|---|---|
| d2-B | Raven 2500 Carbon/Joncryl 67 TEA-OH salt/Joncryl 683 TEA-OH salt | AZC | 109.1 nm/2.76 cps | 107.3 nm/2.79 cps | 106.7 nm/3.05 cps |
| d2-C | Raven 2500 Carbon/Joncryl 67 TEA-OH salt/Joncryl 683 TEA-OH salt | MMM | 115.2 nm/3.13 cps | 115.3 nm/2.96 cps | 111.8 nm/2.93 cps |
| d2-D | Raven 2500 Carbon/Joncryl 67 TEA-OH salt/Joncryl 683 TEA-OH salt | PZC | 106.5 nm/2.89 cps | 110.2 nm/3.06 cps | 107.0 nm/3.16 cps |
| d2-E | SDP100/Joncryl 67 DMEA salt | CDI-V02L2 | 134 nm/15.0 cps | 133 nm/9.11 cps (*) | 133 nm/22.9 cps |
| d2-F | SDP100/Joncryl 67 DMEA salt/Self-crosslinking polyurethane dispersion | CDI-V02L2 | 131 nm/34.8 cps | 134 nm/23.3 cps (*) | 143 nm/28.1 cps |
| d2-G | BG10/Joncryl 67 DMEA salt | CDI-V02L2 | 113 nm/4.96 cps | 125 nm/5.69 cps | 118 nm/6.32 cps |

(*) Data of 1 week incubation 2.2 Self-crosslinking carbon black dispersion using a self-dispersing pigment (example d2-E): In a 250 mL beaker, 100 g of SDP 100 carbon black dispersion, 30.5 g of Joncryl 67 (25% DMEA salt solution), and 30.217 g of CDI solution (40%) were mixed together under agitation. The resulting mixture was stirred for 2 hours until a homogeneous dispersion was obtained. The self-crosslinking dispersion was allowed to incubate at 60° C. for select periods of time in sealed storage containers. After time, the particle size (Z-average) and viscosity were measured. As can be seen in Table III, the dispersion is stable.

2.3 Self-crosslinking carbon black dispersion in combination with a self-crosslinking PUD resin (example d2-F): In a 250 mL beaker, 100 g of SDP 100 carbon black dispersion, 30.5 g of Joncryl 67 (25% DMEA salt solution), 30.217 g of CDI solution (40%), and 10.899 g of self-crosslinking PUD resin PUD-1 (35% solution) were mixed together under agitation. The resulting mixture was stirred for 2 hours until a homogeneous dispersion was obtained. The self-crosslinking dispersion was allowed to incubate at 60° C. for select periods of time in sealed storage containers. After time, the particle size (Z-average) and viscosity were measured. As can be seen in Table III, the dispersion is stable.

2.4 Self-crosslinking cyan dispersion milled with Joncryl 67 polymer and CDI crosslinker (example D2-G): In a tall 1 beaker, 94.30 g of Joncryl 67 (27.32% DMEA salt solution), 95.55 g of CDI crosslinker (40% solution), 1.00 g of BYK-024, and 169.15 g of deionized water were mixed together. While stirring the contents of the beaker with a Teflon® blade at 500 rpm, 140 g of PB15 BG10 pigment was added to the mixture. The resulting mixture was milled at 2500 rpm for 6 hours, resulting in an average particle size of 113.8 nm (Z-average). The resulting mixture was let down to 26.19% solid content by adding water, and 0.3% total weight of Proxel GXL was added, giving a dispersion with 17.5% solids content of cyan pigment and 3.225% solids content of Joncryl® polymer.

The self-crosslinking dispersion was allowed to incubate at 60° C. for select periods of time in sealed storage containers. After time, the particle size (Z-average) and viscosity were measured. As can be seen in Table III, the dispersion is stable.

Example 3

Preparation of Self-crosslinking Inkjet Inks

Self-crosslinking black pigment inkjet inks i3-A to i3-C were prepared from the self-crosslinking pigment dispersions d2-A to d2-C. The compositions of the inks are shown in Table IV (values reported in g). In a typical procedure, 100 g of ink was prepared by mixing the ingredients shown in Table IV under good agitation in a polyethylene bottle. The mixture was stirred for 2 hours, followed by filtration through a Titan 2 HPLC filter, 30 mm 0.7 micron GMF membrane (available from Sun Sri, Rockwood, Tenn.), and stored in a sealed bottle.

The self-crosslinking inks were allowed to incubate at 60° C. for select periods of time in sealed storage containers. After time, the particle size (Z-average) was measured. As can be seen in Table V (values reported in nm), the inks are stable. The one-week value for ink i3-C is believed to be anomalous as the values for subsequent weeks are consistent with one another.

TABLE IV

| Ink label | i3-A | i3-B | i3-C |
|---|---|---|---|
| Type of dispersion | d2-A | d2-B | d2-C |
| Amount of dispersion | 15.770 | 15.665 | 14.800 |
| 2-pyrrolidone | 12.000 | 12.000 | 12.000 |
| Butyl carbitol | 6.000 | 6.000 | 6.000 |
| Sulfolane | 5.000 | 5.000 | 5.000 |
| Triethanolamine | 0.400 | 0.400 | 0.400 |
| Aerosol GPG | 0.300 | 0.300 | 0.300 |
| Coatosil 1220 | 0.200 | 0.200 | 0.200 |
| Water | 60.33 | 60.44 | 61.30 |
| Total amount | 100 | 100 | 100 |

TABLE V

| Ink Label | Starting | 1 week of incubation | 2 weeks of incubation | 3 weeks of incubation | 4 weeks of incubation |
|---|---|---|---|---|---|
| i3-A | 131.1 | 118.5 | 113.4 | 118.7 | 120.9 |
| i3-B | 115.2 | 121.5 | 131.9 | 118.3 | 124.5 |
| i3-C | 109.7 | 141.7 | 112.5 | 120.9 | 114.7 |

Example 4

Preparation of Self-crosslinking Inkjet Inks from Self-dispersing Pigment

Self-crosslinking black pigment inkjet inks i4-A to i4-D were prepared from the self-dispersing pigment SDP 100. The compositions of the inks are shown in Table VI (values reported in g). In a typical procedure, 100 g of ink was prepared by mixing the ingredients shown in Table VI under good agitation in a polyethylene bottle. The mixture was stirred for 2 hours, followed by filtration through a Titan 2 HPLC filter, 30 mm 0.7 micron GMF membrane (available from Sun Sri, Rockwood, Tenn.), and stored in a sealed bottle.

The self-crosslinking inks were allowed to incubate at 60° C. for select periods of time in sealed storage containers. After time, the particle size (Z-average) was measured. As can be seen in Table VII (values reported in nm), the inks are stable.

TABLE VI

| Ink label | i4-A | i4-B | i4-C | i4-D |
|---|---|---|---|---|
| Type of dispersion | SDP-100 | SDP-100 | SDP-100 | SDP-100 |
| Type of crosslinker | CDI-V02L2 | PZC | AZC | MMM |
| Amount of dispersion | 15.150 | 15.150 | 15.150 | 15.150 |
| Amount of crosslinker | 1.330 | 1.935 | 0.610 | 0.220 |
| Joncryl 683 DMEA salt (25% solution) | 1.840 | 1.840 | 1.840 | 1.840 |
| Joncryl 67 DMEA salt (25% solution) | 0.920 | 0.920 | 0.920 | 0.920 |
| 2-pyrrolidone | 12.000 | 12.000 | 12.000 | 12.000 |
| Butyl carbitol | 6.000 | 6.000 | 6.000 | 6.000 |
| Sulfolane | 5.000 | 5.000 | 5.000 | 5.000 |
| Triethanolamine | 0.400 | 0.400 | 0.400 | 0.400 |
| Aerosol GPG | 0.300 | 0.300 | 0.300 | 0.300 |
| Coatosil 1220 | 0.200 | 0.200 | 0.200 | 0.200 |
| Water | 56.86 | 56.26 | 57.58 | 57.97 |
| Total amount | 100 | 100 | 100 | 100 |

TABLE VII

| Ink Label | Starting | 1 week of incubation | 2 weeks of incubation |
|---|---|---|---|
| i4-A | 158.6 | 135.5 | 152.9 |
| i4-B | 129.9 | 138.4 | 139.7 |
| i4-C | 160.6 | 130.5 | 132.1 |
| i4-D | 153.6 | 136.7 | 136 |

What is claimed is:

1. A dispersion, comprising:
a pigment;
a polymer comprising a carboxyl group;
a crosslinking agent capable of undergoing a crosslinking reaction with the carboxyl group;
an inhibition agent comprising a tertiary amine; and
a liquid carrier,
wherein the crosslinking agent is capable of undergoing a reaction with the polymer comprising a carboxyl group in the absence of a tertiary amine but not in the prescence of a tertiary amine,
wherein at least one of the mean particle size and the viscosity of the dispersion increases by less than 20% over about three months in sealed storage at ambient temperature, as determined by accelerated shelf life testing, and
wherein the crosslinking agent comprises at least one of a methylated melamine formaldehyde resin, a zirconium carbonate salt, a carbodiimides reagent, a water dispersible polymer comprising an oxazoline group, and combinations thereof.

2. The dispersion of claim 1, wherein the liquid carrier is water.

3. The dispersion of claim 1, wherein the tertiary amine comprises at least one of a triethylamine, a 2-dimethylaminoethanol, a triethanolamine, and a N,N-diisopropylethanolamine.

4. The dispersion of claim 1, wherein the crosslinking reaction is facilitated by heat.

5. The dispersion of claim 1, wherein the polymer is a dispersant.

6. The dispersion of claim 1, wherein the pigment is not a self-dispersing pigment.

7. The dispersion of claim 1, wherein the pigment is a self-dispersing pigment.

8. The dispersion of claim 1, wherein the polymer comprises at least one of a styrene-acrylic copolymer, a styrene-methacrylic acid copolymer, a maleic resin, a maleic anhydride-modified polymer, a carboxylated polyurethane, a carboxylated styrene-butadiane block copolymer, a carboxylated styrene-butadiene-styrene block copolymer, a carboxylated styrene-isoprene-styrene block copolymer, a carboxylated polyolefin, and combinations thereof.

9. A dispersion, comprising:
a pigment;
a polymer comprising a carboxyl group;
a crosslinking agent capable of undergoing a crosslinking reaction with the carboxyl group;
an inhibition agent comprising a tertiary amine; and
a liquid carrier,
wherein the crosslinking agent is capable of undergoing a reaction with the polymer comprising a carboxyl group in the absence of a tertiary amine but not in the presence of a tertiary amine, wherein at least one of the mean particle size and the viscosity of the dispersion increases by less than 20% over about three months in sealed storage at ambient temperature, as determined by accelerated shelf life testing, and further comprising an additional self-crosslinking polymer.

10. An ink comprising the dispersion of claim 1.

11. The ink of claim 10, further comprising at least one of a liquid ink diluent, a defoamer, a biocide, and a surfactant.

12. The ink of claim 10, wherein at least one of the mean particle size and the viscosity of the ink or dispersion increases by less than 20% over about three months in sealed storage at ambient temperature, as determined by accelerated shelf life testing.

13. A pre-loaded inkjet cartridge comprising the ink of claim 10.

14. A printing method, comprising:
applying the ink of claim 10 onto a substrate; and
drying the ink, whereupon the crosslinking agent and the carboxyl group undergo the crosslinking reaction.

15. The method of claim 14, wherein the applying step comprises using a printer.

16. The method of claim 14, wherein the drying step comprises heating the ink.

17. The method of claim 14, wherein the crosslinking reaction substantially occurs during the drying step, after the drying step or both.

18. The method of claim 14, wherein the substrate comprises at least one material selected from the group consisting of a paper, a textile, a metal, a ceramic, a glass, a plastic and a wood.

19. A method of preparing a pigment dispersion, comprising:
combining a pigment, a polymer comprising a carboxyl group, a crosslinking agent capable of undergoing a crosslinking reaction with the carboxyl group, an inhibition agent comprising a tertiary amine, and a liquid carrier to form a dispersion;
wherein at least one of the mean particle size and the viscosity of the dispersion increases by less than 20% over about three months in sealed storage at ambient temperature, as determined by accelerated shelf life testing; and
wherein the crosslinking agent comprises at least one of a methylated melamine formaldehyde resin, a zirconium carbonate salt, a carbodiimides reagent, a water-dispersible polymer comprising a carbodiimide group, an oxazoline reagent, a water dispersible polymer comprising an oxazoline group, and combinations thereof.

20. The method of claim 19, further comprising milling the pigment.

21. The method of claim 20, wherein the crosslinking agent is combined with the other components of the dispersion either before or after the milling step.

22. The method of claim 19, wherein the milling step occurs either during or after the combining step.

23. The method of claim 19, wherein the polymer comprises at least one of a styrene-acrylic copolymer, a styrene-methacrylic acid copolymer, a maleic polymer, a maleic anhydride-modified polymer, a carboxylated polyurethane, a carboxylated styrene-butadiene block copolymer, a carboxylated styrene-butadiene-styrene block copolymer, a carboxylated styrene-isoprene-styrene block copolymer, a carboxylated polyolefin, and combinations thereof.

24. The method of claim 19, wherein the tertiary amine comprises at least one of a triethylamine, a 2-dimethylaminoethanol, a triethanolamine, and a N,N-diisopropylethanolamine.

* * * * *